United States Patent

[11] 3,602,534

| [72] | Inventor | Sherman L. Dragoo |
| --- | --- | --- |
|  |  | Yorktown, Ind. |
| [21] | Appl. No. | 839,369 |
| [22] | Filed | July 7, 1969 |
| [45] | Patented | Aug. 31, 1971 |
| [73] | Assignee | Corrugated Finishing Products, Inc. |
|  |  | Anderson, Ind. |

[54] SPLIT SLEEVE CLAMP
9 Claims, 4 Drawing Figs.

| [52] | U.S. Cl. | 287/52.03, 287/111 |
| --- | --- | --- |
| [51] | Int. Cl. | F16d 1/06 |
| [50] | Field of Search | 287/111, 136, 136 A, 52.09, 52.03, 52.04; 64/6; 279/1 F, 18, 8; 269/127 |

[56] References Cited
UNITED STATES PATENTS

| 1,089,954 | 3/1914 | Pemberton | 287/52.09 |
| --- | --- | --- | --- |
| 3,012,419 | 12/1961 | Dovey | 64/6 |
| 3,285,642 | 11/1966 | Sauer | 287/189.36 |

*Primary Examiner*—David J. Williamowsky
*Assistant Examiner*—Wayne L. Shedd
*Attorney*—Woodward, Weikart, Emhardt & Naughton ABSTRACT: Sleeve halves, each having a pair of cavities facing corresponding cavities of the other, are clamped to a shaft by axially slidably clamps, one mounted in each half and projecting into the other half. Socket setscrews threadedly received in the sleeve halves drive the clamps axially engaging cam surfaces thereof with fixed pins to draw the halves together.

PATENTED AUG 31 1971

INVENTOR
SHERMAN L. DRAGOO

BY
Woodard, Weikart, Emhardt & Naughton
ATTORNEYS

PATENTED AUG 31 1971 3,602,534

INVENTOR
SHERMAN L. DRAGOO
BY
Woodard, Weikart, Emhardt & Naughton
ATTORNEYS

3,602,534

SPLIT SLEEVE CLAMP

BACKGROUND OF THE INVENTION

1. Field of the Invention

This invention relates generally to rotary diecutting and more particularly to split anvils and split die-mounting heads with new and advantageous means for securing the portions thereof together on a shaft.

2. Description of the Prior Art

Various types of split anvils and die-mounting heads are known. One type of locking together the halves of a split sleeve is shown and described in the U.S. Pat. No. 3,285,642 issued to L. E. Sauer on Nov. 15, 1966. Another type of locking is shown and described in the U.S. Pat. No. 3,012,419 issued to Norman E. Dovey on Dec. 12, 1961.

The structure described in the Sauer patent is a bit sophisticated, involving eccentric cams, locking detents and springs. Although it can be operated from either end face of the head, the direction of rotation of the clamp shafts 40 and locking shafts 54 for securing the collar on the shaft is different (from the operator's point of view) depending upon whether the approach is from the right-hand side or the left-hand side of the head. The result is that if an operator does not pay particular attention to the arrows and recall whether they mean tightening or loosening, there is a good chance that he will think he has tightened the clamp when, in fact, he has loosened it.

The latch disclosed in the Dovey patent requires both left- and right-hand threads on the operating bolt. There is no means of visual indication whether or not the latch is secured. In addition, there by be some looseness of the bolt and saddle members of a type tending to contribute to loss or separation thereof from both of the sleeve halves during installation or removal of the halves from a shaft.

It is desirable to provide a simple, inexpensive, durable and reliable structure for clamping the portions of split sleeves on a shaft. It is further desirable that such means be operable from one face of the unit and that they be concealed, when tight. The present invention is directed toward attainment of these objectives.

SUMMARY OF THE INVENTION

Described briefly, in a typical embodiment of the present invention, each half of a split sleeve has an axially slidable clamp mounted therein with a cam surface thereof projecting into the other half, the latter having a pin engageable by the cam surface upon axial advance of the clamp in the first half of the sleeve. A cam advance screw is threadedly received in the sleeve half and has a bearing face thereof engaging a bearing face of the clamp for positive advance of the clamp upon rotation of the screw. The screw has a head received in a slot in the clamp accommodating withdrawal of the clamp along with the screw for release of the sleeve halves, the clamp and setscrew remaining captive in that particular half in which they are mounted. The length of the screw is determined to provide visual indication of the clamping condition.

DESCRIPTION OF THE PREFERRED EMBODIMENT

Figure 1:
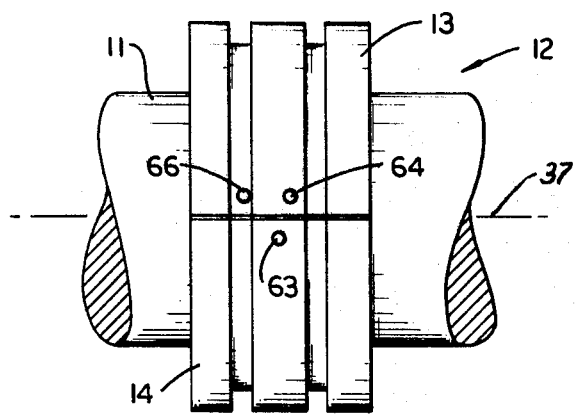
FIG. 1 is an elevational view of a T-slot head secured to a shaft and incorporating a typical embodiment of the present invention.

Referring now to the drawings in detail, FIG. 1 shows a shaft 11 on which is mounted a split sleeve 12 of a configuration providing a T-slot head. This will serve as a mounting base to which rotary dies can be secured but, as will be seen, the invention is applicable as well to rotary anvils which may be covered with polyurethane, and also to other devices requiring a split sleeve construction. In the illustrated embodiment, the head 12 is formed of two halves 13 and 14 secured together in a manner which will now be described.

Figure 2:
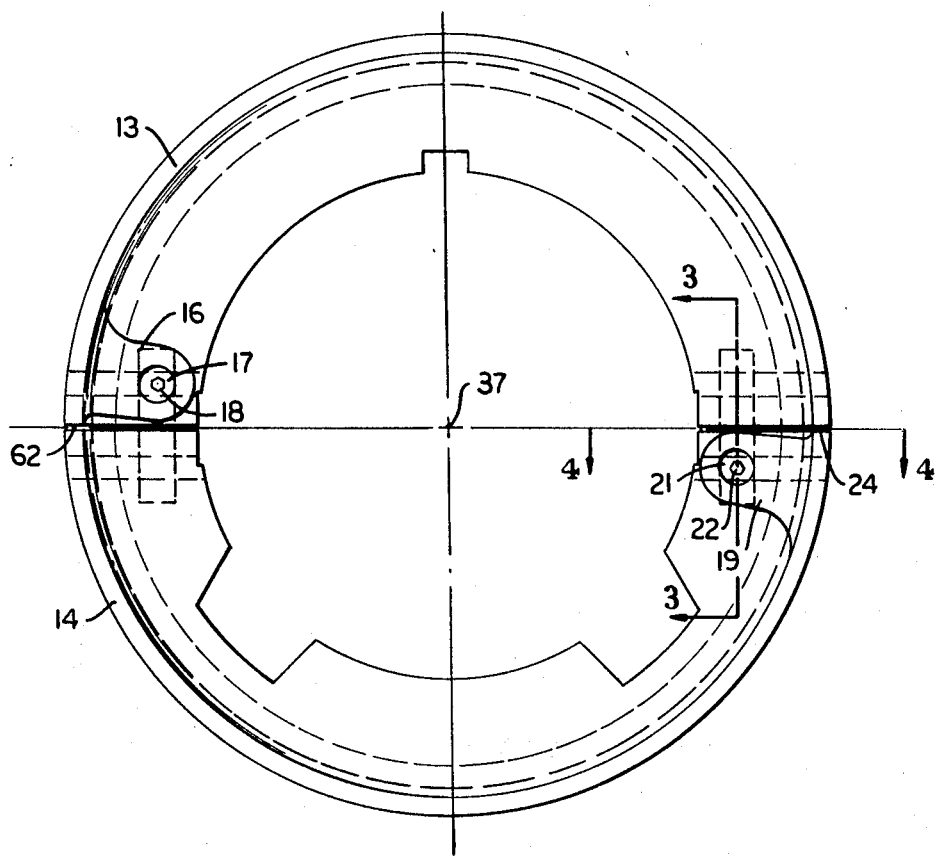
FIG. 2 is a right-hand side (end) view thereof with the shaft removed.

Referring to FIG. 2, sleeve 13 has a boss 16 in which a setscrew 17 is received, with a hexagonal tool-receiving socket 18 exposed therein. Similarly, sleeve half 14 has the boss 19 threadedly receiving a clamp-activating setscrew 21 having a hexagonal tool-receiving socket 22 in the end thereof. Because of the fact that each of the halves of the sleeve incorporates clamping details like those in the other half, only one will be described and this will begin particularly with reference to FIG. 3.

Figure 3:
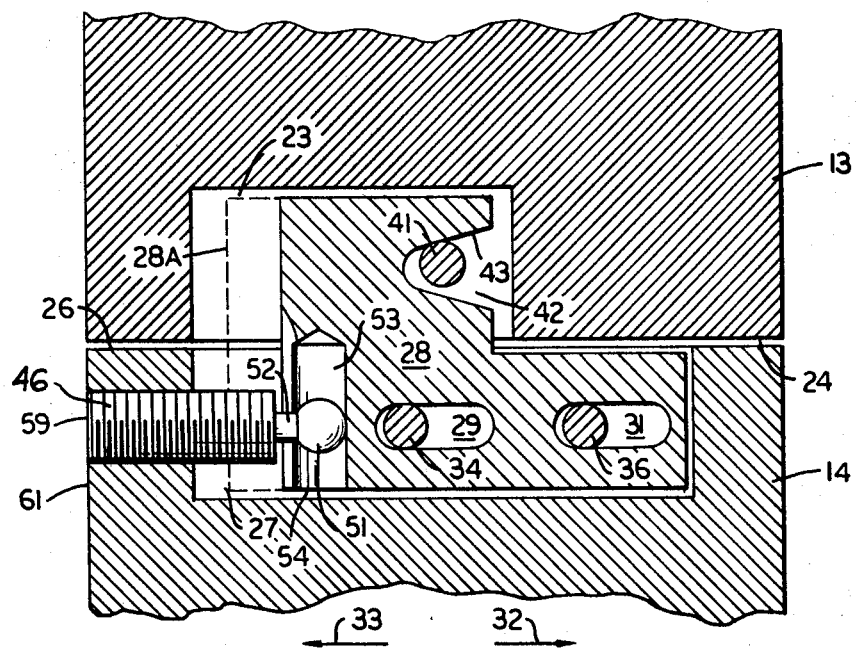
FIG. 3 is a section taken at line 3—3 in FIG. 2 and viewed in the direction of the arrows, the section being an enlargement.

As shown in FIG. 3, the sleeve member 13 is provided with a cavity 23 therein opening at the face 24 thereof, the latter facing a complimentary surface 26 of the sleeve member 14, the latter having a cavity 27 therein disposed in registry with cavity 23. A clamp 28 having a pair of slots 29 and 31 therein is disposed in the cavity 27 and movable forward in the direction of arrow 32 or backward in the direction of arrow 33, the slots 29 and 31 being received on pins 34 and 36, respectively, for maintaining proper location of the clamp. The pins 34 and 36 are press fitted into the sleeve member 14. The location of the clamp with respect to the longitudinal cylindrical axis 37 is maintained by the sidewalls 38 and 39 of the cavity 27.

Figure 4:
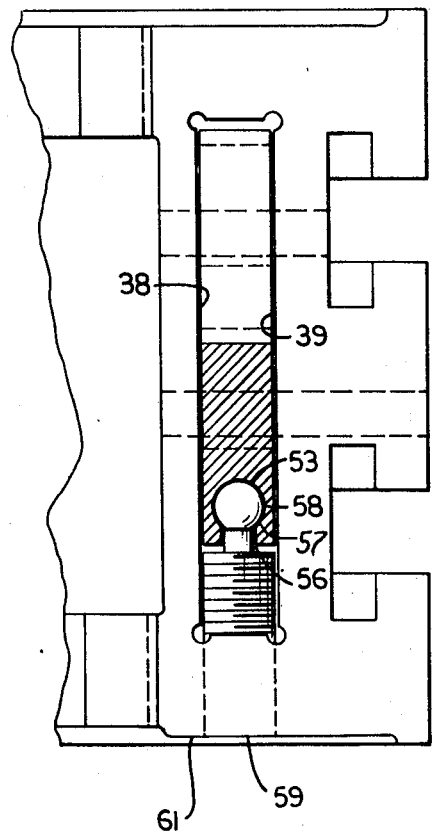
FIG. 4 is a section on the same scale as FIG. 3 and taken at line 4—4 in FIG. 2 and viewed in the direction of the arrows.

FIGS. 3 and 4 show the clamp in the locking position whereby it secures the sleeve members 13 and 14 on the shaft 11. This is accomplished by reception of a pin 41 of the member 13 in the cavity or recess 42 of the clamp. This pin 41 is press fitted in the sleeve member 13 and, like pins 34 and 36, extends generally toward the central axis 37. The face 43 of the clamp recess 42, because it faces generally downwardly toward the sleeve member 14 and at an angle, is an effective cam surface which pulls the member 13 toward member 14 as the clamp is advanced in the direction of arrow 32 from the position shown by the dotted outline 28A to the position shown by the solid outline. Movement of the clamp in this manner is caused by the clamp drivescrew 46.

The screw 46, has a ball-shaped head 51 thereon at the end of a stem portion 52 projecting from the screw body. This head is received in a vertically extending slot 53, opening at the bottom of the clamp at 54 and opening in the rear end of the clamp at 56. As can be seen in FIG. 4, the slot 53 is actually a vertically bored hole of a greater diameter than the milled entrance slot 56. As the screw is turned clockwise, in the threads of the sleeve member 14, the head 51 advances the clamp in the direction of arrow 32, securing the lock. As the screw is turned counterclockwise in the threads of the sleeve member 14, the ball surface 57 engaging the mating surface 58 of the slot 53 is effective to withdraw the clamp in the direction of arrow 33 and disengage the lock.

As shown in FIGS. 3 and 4, wherein the clamp is advanced to locking position, securing the sleeve halves on the shaft, the outer end 59 of the screw is flush with the sleeve boss side face 61, thus indicating the locked condition. When the screw is withdrawn to the extent required to unlock the clamp, the screw protrudes from the face 61 approximately one-half inch.

As an example of proportions, where the head is to be employed on a shaft having a 6-inch diameter, the lockscrew employed can be a ½—13×1.75 inches long socket setscrew. The diameter of the ball head 51 may be 0.365 inches, while the stem 52 diameter may be 0.240 inches.

The clamp, clamp-engaging drivescrew 17, and associated components mounted in the sleeve member 13 at face 62 (FIGS. 2) on the opposite side of the axis 37 from the face 24, may be identical to that mounted in the sleeve member 14.

The clamp is received on pins 64 and 66 (FIG. 1) which are, in sleeve member 13, the counterparts of the pins 34 and 36 in the sleeve member 14. The clamp, operated by screw 17, engages a pin 63 press fitted into the sleeve member 14, just as the clamp 28 engages the pin 41 press fitted into the member 13. Pins 63 and 41 are located equidistant between the ends of the sleeve members.

It should be recognized that the present invention provides a simple, inexpensive and reliable lock which is particularly durable.

Because of a single winding direction of the thread on both drivescrews 17 and 21, preferably right hand, and the visual check feature, the chance of error in mounting the sleeves of the present invention is virtually nonexistent. In addition to its utilization on the T-slot head, the present invention can be used on a variety of other split sleeve or split collar structures including, for example, the polyurethane covered anvils.

The invention claimed is:

1. A sleeve combination comprising:
first and second sleeve portions having an axis;
a clamp mounted in said first portion and projecting into said second portion;
a clamp drive member mounted in said first portion and engaging said clamp and operable to drive said clamp axially in said first portion;
first and second pins in said first portion extending generally toward said axis and guidingly receiving said clamp thereon;
a third pin secured in said second portion and extending generally toward said axis and engageable by said clamp upon axial movement thereof in one direction to clamp said first and second sleeve portions onto a shaft;
said clamp has a cavity in the portion thereof in said second sleeve portion and lockingly engaging the said pin in said second sleeve portion;
said first sleeve portion includes a threaded aperture parallel to said axis and threadedly receiving said drive member;
said clamp includes a slot extending perpendicular to the axis of said threaded aperture; and,
said drive member includes a head received in said slot and sized to preclude removal therefrom in a direction of said threaded aperture, enabling retraction of said clamp from locking engagement with said pin in said second sleeve portion.

2. The combination of claim 1 wherein:
said drive member is a screw having a thrust ball abuttingly engaging a thrust socket of said clamp.

3. A split sleeve, combination comprising:
first and second semicylindrical sleeve members, each having a pair of faces on opposite sides of its axis and facing complementary faces of the other, and each having a cavity in each said face thereof registering with a cavity in the said complementary face of the other;
a first clamp mounted in one of said cavities in said first sleeve member and projecting into the registering cavity of the second sleeve member;
a second clamp mounted in one of said cavities in said second member and projecting into the registering cavity of said first sleeve member;
clamp engagement means in each of said registering cavities;
and first and second clamp activating screws in said first and second sleeve members respectively and having tool receivers facing in the same direction, said first and second screws engaging respectively said first and second clamps.

4. The sleeve of claim 3 wherein:
each of said screws has only a single thread winding direction thereon.

5. The combination of claim 3 and further comprising:
a shaft receiving said sleeve members thereon.

6. The sleeve of claim 3 wherein:
each of said activating screws is threadedly received in its respective sleeve member.

7. The sleeve of claim 6 wherein:
each of said clamps has a cam surface thereon facing toward the respective sleeve member in which said clamp is mounted, for wedging engagement with the said clamp engagement means of the other sleeve member during activation of the clamp for camming said first and second sleeve members toward each other.

8. The sleeve of claim 7 wherein:
each of said screws has a bearing surface distinct from the threads thereof and bearing on a face of the one of said clamps activated thereby for driving said clamp in camming engagement with said clamp engagement means of the sleeve member into which said one clamp projects.

9. The sleeve of claim 8 wherein:
each of said screws has a head at an end thereof in a slot in the clamp activated thereby, and retaining in said slot to limit relative axial movement between said screw and said clamp and enable release of said clamp by operation of said screw.